United States Patent Office 3,803,176
Patented Apr. 9, 1974

3,803,176
SULFONYLUREA DERIVATIVES
Haldor Christensen, Tastrup, Behrend Friedrich Lundt, Soborg, Frederick Christian Gronvald, Vedbaek, and William Andersen, Lyngby, Denmark, assignors to Novo Terapeutisk Laboratorium A/S, Bagsvaerd, Denmark
No Drawing. Continuation-in-part of application Ser. No. 33,864, May 1, 1970. This application Dec. 4, 1972, Ser. No. 311,812
Int. Cl. C07d 7/32
U.S. Cl. 260—345.2
13 Claims

ABSTRACT OF THE DISCLOSURE

The invention provides novel sulfonylurea derivatives of the formula:

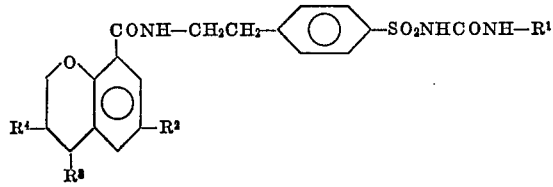

and salts thereof, in which $R^1$ is n-butyl, isobutyl, cyclopentyl, cyclohexyl, 4-methylcyclohexyl, cyclohexenyl or endoethylenecyclohexyl, $R^2$ is methyl, methoxy, chlorine, bromine or hydrogen, $R^3$ and $R^4$ are each hydrogen, or $R^3$ and $R^4$ may together form an additional bond in which case $R^2$ is chlorine, only.

These compounds are useful in the oral treatment of diabetes mellitus.

---

This application is a continuation-in-part of our co-pending application U.S. Ser. No. 33,864 filed on May 1, 1970.

The present invention relates to novel sulfonylurea derivatives having the structural formula:

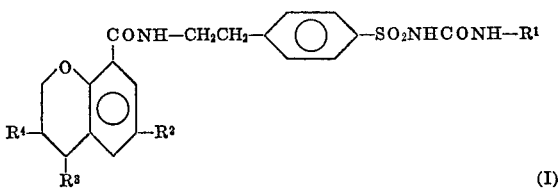

and salts thereof, in which $R^1$ is n-butyl, isobutyl, cyclopentyl, cyclohexyl, 4-methylcyclohexyl, cyclohexenyl or endoethylenecyclohexyl, $R^2$ is methyl, methoxy, chlorine, bromine or hydrogen, $R^3$ and $R^4$ are each hydrogen, or $R^3$ and $R^4$ may together form an additional bond in which case $R^2$ is chlorine, only.

Examples of bases which may be used to form physiologically tolerable salts of the benzenesulfonylureas of the Formula I are sodium and potassium hydroxide, alkoxides, bicarbonates and carbonates.

The $R^1$-groups of the foregoing Formula I, as defined, do not differ from those used in the prior art. The essence, structurally, of the present invention resides entirely in the bicyclic acylamido-groups of the formula:

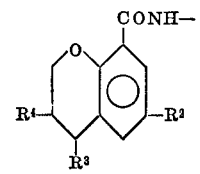

in which $R^2$, $R^3$ and $R^4$ are as defined above. These bicyclic acylamido-groups are derived from 6-chloro-2H-chromen-8-carboxylic acid (III) or from chroman-8-carboxylic acids (IV) of the formulas:

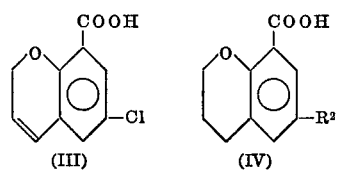

where $R^2$ is methyl, methoxy, bromine, chlorine or hydrogen. These carboxylic acids are novel compounds with the exception of chroman-8-carboxylic acid (Yakugaku Zasshi 81, 453 (1961)). Thus, the invention provides also the following novel carboxylic acids for use as starting materials:

6-methylchroman-8-carboxylic acid,
6-methoxychroman-8-carboxylic acid,
6-chlorochroman-8-carboxylic acid, and
6-bromochroman-8-carboxylic acid, which have all been prepared by processes similar to the process used to prepare chroman-8-carboxylic acid, and 6-chloro-2H-chromen-8-carboxylic acid, which has been prepared from the methylester of 6-chlorochroman-8-carboxylic acid through bromination in position 4 by treatment with N-bromosuccinimide followed by dehydrobromination and saponification.

The preferred compounds of the invention are those of the Formula I in which $R^1$ is cyclohexyl or 4-methylcyclohexyl and in which the acylamido-group of the Formula II is selected from the group consisting of:

chroman-8-carboxamido-,
6-methylchroman-8-carboxamido-,
6-methoxychroman-8-carboxamido-,
6-chlorochroman-8-carboxamido-,
6-bromochroman-8-carboxamido-, and
6-chloro-2H-chromen-8-carboxamido.

The novel sulfonylurea derivatives of the Formula I may be prepared by a variety of procedures already known per se in the prior art. The preferred method of preparation may be illustrated as follows:

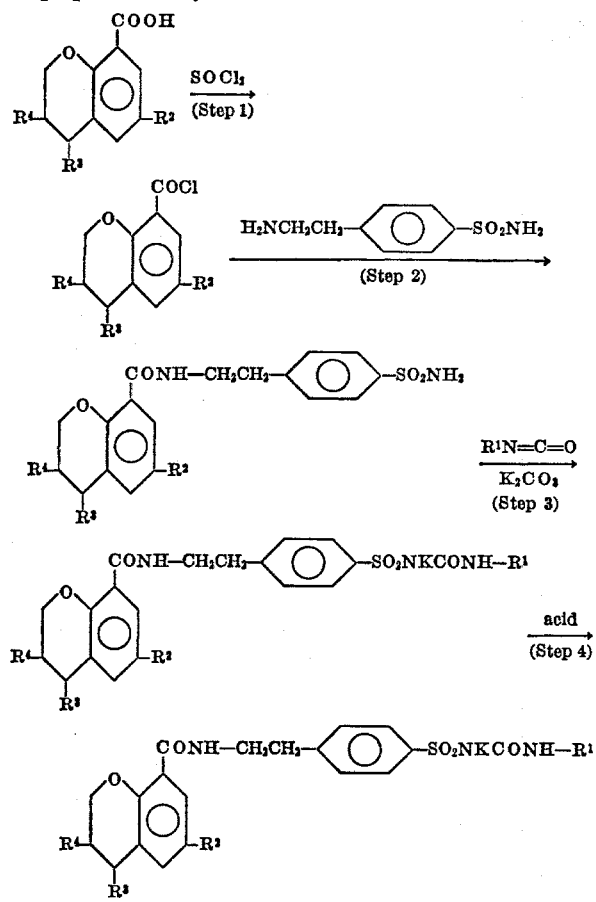

Step 1 is a conventional conversion of the carboxylic acid in question to the corresponding acid chloride. This is conveniently performed by treating the carboxylic acid with thionyl chloride using a trace of dimethylformamide as a catalyst. This reaction may be performed in a large excess of thionyl chloride or preferably in an inert hydrocarbon solvent as for example isooctane using about 1.5 moles of thionyl chloride per mole of carboxylic acid. Most of the acid chlorides of this invention are solids which are easily isolated by filtration. The excess thionyl chloride and the hydrocarbon solvent may also be removed by vacuum stripping after the reaction thus leaving a crude acid chloride which may be used in Step 2 without further purification. This method of work-up is particularly useful in those cases where the acid chlorides are liquids.

Step 2 is an acylation process which may be carried out in the conventional manner using pyridine as solvent and acid binding agent. More preferred is an acylation scheme in which a solution of the acid chloride in dioxane is added to a solution of 4-(2-aminoethyl)-benzenesulfonamide hydrochloride (J. Am. Chem. Soc. 62, 2099 (1940)) in dioxane-water at a lower temperature—preferably at 5° C. to 10° C.—while the pH is maintained at approximately 9.8 by simultaneous addition of sodium hydroxide solution. After this reaction the pH is lowered by addition of acid and the 4-(2-acylamido-ethyl)-benzenesulfonamide is recovered by filtration and is purified by recrystallization from a suitable solvent system.

Step 3 consists in a conversion of the sulfonamide prepared in Step 2 to a salt of the desired sulfonylurea derivative through reaction with the appropriate $R^1$-substituted isocyanate in the presence of a base. This reaction is preferably performed in dry acetone using anhydrous potassium carbonate as the base. The potassium salts of the desired sulfonylurea derivatives are—with a few exceptions—insoluble in anhydrous acetone and are thus recovered by filtration.

Step 4 is a conversion of the salts of the sulfonylurea derivatives, usually the potassium salts, as prepared in Step 3 to the free sulfonylurea derivatives. The salts from Step 3 are dissolved in water or in water containing some acetone and the pH is lowered to approximately 9.2. Small amounts of unreacted sulfonamide and small amounts of a urea derivative of the formula $R^1NHCONHR^1$ may then be removed by filtration and the filtrate is acidified. The desired sulfonylurea derivative is finally recovered by filtration.

A further step may be added if desired by conversion of the sulfonylurea derivatives obtained in Step 4 to their salts preferably the sodium salts or the potassium salts. Such salts may be used in pharmaceutical preparations of the compounds or they may be used as a means of further purification of the sulfonylurea derivatives. The formation of these salts is a simple operation in which the sulfonylurea derivative in question is treated with a slight excess of a base as for example sodium methylate or potassium hydroxide in a polar solvent as for example methanol after which it is usually advantageous to add a solvent in which the desired salt is only sparingly soluble as for example diethyl ether or acetone. The desired salt of the sulfonylurea derivative is then recovered by filtration.

When the compounds of the present invention are employed as therapeutic agents they may be administered alone or in combination with pharmaceutically acceptable excipients, the proportion of which is determined by the solubility and chemical nature of the compound, chosen method of administration and standard pharmaceutical practice. For example, they may be administered orally in the form of tablets, capsules or pellets containing such excipients as lactose, glucose, saccharose, mannitol, sorbitol, starches derived from wheat, corn, rice and potato, microcrystalline cellulose and other cellulose derivatives, acacia, traganth, gelatine, alginates, polyethylene glycols, polyvinylpyrrolidone, magnesium aluminum silicate, talc, metallic stearates, stearic acid, silicium dioxide and surfactants. The tablets or pellets may furthermore be coated with a membrane of cellulose derivatives, methacrylates, waxes, fatty acids and cellulose acetate phthalate to achieve a sustained release of the active ingredient.

Thus, anyone of the benzenesulfonylurea compounds of the invention may be mixed with the excipients in question or it may be distributed upon these as a solution followed by evaporation of the solvent. A glidant as for example talc and a lubricant as for example magnesium stearate may then be added and the mixture is finally compressed into tablets or filled into hard gelatine capsules. It is also possible at the stage before the addition of the glidant and the lubricant to granulate the mixture by using—as an example—a solution of polyvinylpyrrolidone in water or in alcohols and other organic solvents. The wet granules may then be shaped into pellets in equipment well established for this purpose or they may be dried directly and used to make tablets or to fill into capsules as mentioned above. The tablets or the pellets may be coated in a coating pan or in a fluidized bed apparatus with a thin diffusion membrane—as for example a membrane of ethylcellulose—to obtain a sustained release of the active ingredient.

The dosage of the present therapeutic agents will vary with the method of administration and the particular compound chosen. Furthermore, it will vary with the subject under treatment. In general, the compounds of this invention are most desirably administered at a dosage level that will afford effective results and preferably at a dosage level that is in the range of from 1 mg. to about 25 mg. per day, although, in individual cases, division as well as multiplication of doses may be necessary.

The novel sulfonylurea derivatives of the Formula I exert a strong blood-sugar lowering activity in mammals after oral administration and are thus useful for the preparation of pharmaceutical compositions for oral treatment of maturity-onset diabetes mellitus.

The strong blood-sugar lowering activity of the novel compounds of the Formula I has been demonstrated by feeding solutions of their sodium salts to fasted rabbits and measuring their blood-sugar concentration over a prolonged period of time by the modified method of W. S. Hoffmann (J. Biol. Chem. 120, 51 (1937) using a Technicon Autoanalyzer. The blood-sugar lowering activity of a number of the novel sulfonylurea derivatives described below is shown in Table I.

The blood-sugar lowering activity of the following 3 compounds of the prior art is given in Table II for comparison.

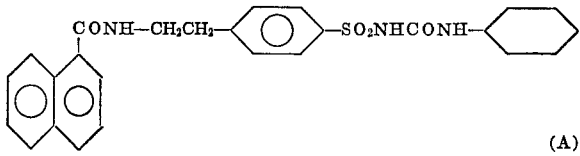

(A)

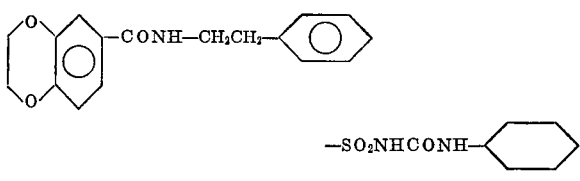

(B)

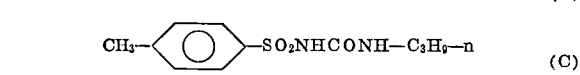

(C)

Compound A is described in Danish Pat. No. 118,553 (Example 1) along with a number of sulfonylurea derivatives of a similar structure all of which contain acylamido-groups derived from bicyclic ring systems containing carbon atoms, only, in the rings.

Compound B is described in Danish Pat. No. 119,052 (Example 53) and represent the very few known compounds containing an acylamido-group derived from a bicyclic ring system containing oxygen atoms in the ring.

Compound C is tolbutamide which is the oral antidiabetic compound used most widely so far.

Table I

Blood-sugar lowering activity as percent decrease of initial blood-sugar concentration in rabbits after oral administration of a single dose following 16 hours of fasting.

A dash (—) indicates a blood-sugar lowering measured to be less than 10%.

| No. | Compound | Dose, mg./kg. | Lowering of blood-sugar concentration (percent) after— | | | |
|---|---|---|---|---|---|---|
| | | | 4 hrs. | 6 hrs. | 8 hrs. | 24 hrs. |
| 1 | N-(4-(2-(6-methyl-chroman-8-carbox-amido)-ethyl)-benzenesulfonyl)-N'-cyclopentylurea. | 0.2 0.05 | 35 13 | 37 12 | 33 — | 10 — |
| 2 | N-(4-(2-(6-methyl-chroman-8-carbox-amido)-ethyl)-benzenesulfonyl)-N'-(4-methylcyclohexyl)-urea. | 0.2 0.05 0.02 | 34 12 10 | 42 25 14 | 44 26 14 | 20 — — |
| 3 | N-(4-(2-(6-bromo-chroman-8-carbox-amido)-ethyl)-benzenesulfonyl)-N'-cyclohexylurea. | 0.2 0.05 | 28 18 | 31 19 | 30 20 | 18 — |
| 4 | N-(4-(2-(6-chloro-2H-chroman-8-carbox-amido)-ethyl)-benzenesulfonyl)-N'-cyclohexylurea. | 0.2 0.05 | 32 22 | 32 21 | 31 23 | — — |
| 5 | N-(4-(2-(6-chloro-chroman-8-carbox-amido)-ethyl)-benzenesulfonyl)-N'-cyclohexylurea. | 0.2 0.05 0.01 | 36 23 — | 38 23 10 | 41 24 — | 26 14 — |

TABLE I—Continued

| No. | Compound | Dose, mg./kg. | Lowering of blood-sugar concentration (percent) after— | | | |
|---|---|---|---|---|---|---|
| | | | 4 hrs. | 6 hrs. | 8 hrs. | 24 hrs. |
| 6 | N-(4-(2-(chroman-8-carboxamido-)-ethyl)-benzenesulfonyl)-N'-n-butylurea. | 0.2 | 16 | 16 | 15 | — |
| 7 | N-(4-(2-(6-methoxy-chroman-8-carbox-amido)-ethyl)-benzenesulfonyl)-N'-(4-methylcyclohexyl)-urea. | 0.2 0.05 | 30 13 | 36 14 | 33 16 | — — |
| 8 | N-(4-(2-(6-chloro-chroman-8-carbox-amido)-ethyl)-benzenesulfonyl)-N'-(1,4-endoethylenecyclo-hexyl)-urea. | 0.2 | 13 | 20 | 13 | — |
| 9 | N-(4-(2-(6-methyl-chroman-8-carbox-amido)-ethyl)-benzenesulfonyl)-N'-(2-cyclohexenyl)-urea. | 0.2 0.05 | 28 11 | 25 13 | 25 13 | — — |
| 10 | N-(4-(2-(6-methyl-chroman-8-carbox-amido)-ethyl)-benzenesulfonyl)-N'-cyclohexylurea. | 0.2 0.05 | 31 18 | 34 31 | 32 23 | 26 14 |
| 11 | N-(4-(2-(6-chloro-chroman-8-carbox-amido)-ethyl)-benzenesulfonyl)-N'-(2-cyclohexenyl)-urea. | 0.2 0.05 | 27 12 | 29 14 | 29 16 | 20 — |

Table II

Blood-sugar lowering activity in rabbits of known benzenesulfonylurea derivatives when tested in exactly the same manner as the compounds of Table I.

| Compound | Dose, mg./kg. | Lowering of blood-sugar-concentration (percent) after— | | | |
|---|---|---|---|---|---|
| | | 4 hrs. | 6 hrs. | 8 hrs. | 24 hrs. |
| A — N-(4-(2-(naphtalene-1-carboxamido)-ethyl)-benzenesulfonyl)-N'-cyclohexylurea. | 2.0 1.0 0.75 0.3 | 29 21 14 — | 34 29 23 14 | 33 25 21 13 | — — — — |
| B — N-(4-(2-(3,4-methylene-dioxybenzamido)-ethyl)-benzenesulfonyl)-N'-cyclohexyl-urea. | 1.0 0.5 0.2 | 35 31 12 | 40 36 19 | 34 31 15 | 11 — — |
| C — N-(4-(methylbenzene-sulfonyl)-N'-n-butyl-urea (tolbutamide). | 40 30 20 10 | 29 25 20 14 | 33 24 18 13 | 33 19 18 — | — — — — |

The novel benzenesulfonylurea derivatives of the invention are furthermore distinguished by a very low acute toxicity as compared to tolbutamide. Thus, the margin of safety is widened by a higher potency as well as by a low degree of toxicity.

A better understanding of the invention will be gained from the following non-limitative examples which are for the purpose of illustrating the various features thereof.

EXAMPLE 1

N - (4 - (2 - (6 - methylchroman - 8 - carboxamido)-ethyl)-benzenesulfonyl)-N'-(4-methylcyclohexyl)-urea (A) 6 - methylchroman - 8 - carboxylic acid.—(a) Methyl-2-allyloxy-5-methylbenzoate: 429 g. of methyl-5-methylsalicylate, 356 g. of anhydrous powdered potassium carbonate, 430 ml. of acetone and 312 g. of allyl bromide are mixed and stirred with reflux for 24 hours. Approximately 400 ml. of acetone is then distilled off and the residue is cooled to 20° C. 1200 ml. of water is added and the desired material is extracted with 245 ml. of toluene. The toluene solution is dried over anhydrous sodium sulfate and the toluene is then distilled off. The residue is fractionated in vacuum to yield 396 g. (74%) of methyl-2-allyloxy-5-methylbenzoate, B. P. (10 mm. Hg)=152–154° C.

(b) Methyl-3-allyl-5-methylsalicylate: 396 g. of methyl - 2 - allyloxy - 5 - methylbenzoate and 396 g. of N-methyl-2-pyrrolidone are refluxed in a nitrogen atmosphere for 3 hours and then cooled to 40° C. Fractionation in vacuum yields 342 g. (86%) of 3-allyl-5-methyl-salicylate, B.P. (11 mm. Hg)=142–144° C.

(c) Methyl - 3 - allyl - 5 - methyl-acetylsalicylate: 247 g. of methyl-3-allyl-5-methylsalicylate, 0.4 g. of p-toluenesulfonic acid and 264 ml. of acetic anhydride are mixed and stirred with reflux for 19 hours. The solution is cooled to 25° C. and 700 ml. of water is added. The mixture is then extracted twice with toluene (300 ml.+150 ml.) and the combined toluene layers are dried over anhydrous sodium sulfate. Toluene is then distilled off in vacuum and the residue is fractionated in vacuum to yield 253 g. (85%) of methyl-3-allyl-5-methyl-acetylsalicylate, B.P. (0.8 mm. Hg)=123–125° C.

(d) 6 - methylchroman - 8 - carboxylic acid: Dry hydrogen bromide gas (approximately 110 g.) is bubbled through a mixture of 149 g. of methyl-3-allyl-5-methyl-acetylsalicylate, 3.5 g. of benzylperoxide and 410 ml. of carbon tetrachloride at —5° C. to 0° C. Stirring is continued at this temperature for additional 3 hours after the hydrogen bromide saturation and the mixture is then left standing at approximately 0° C. overnight. The carbon tetrachloride and excess hydrogen bromide is stripped off in vacuum and the residue (174 g.) is dissolved in 200 ml. of methanol. This solution is added dropwise to a solution of 118 g. of potassium hydroxide in 250 ml. of methanol while the temperature is maintained at 25° C. to 30° C. during the addition. Stirring is continued at this temperature for additional 30 minutes after which the mixture is refluxed for one hour and finally is cooled to room temperature. Methanol is now distilled off in vacuum and the residue is dissolved in 400 ml. of water. The solution is filtered and is then added with stirring to a mixture of 185 ml. of concentrated hydrochloric acid (37%) and 300 g. of crushed ice. The crystals are filtered off, washed with water and then dried. The yield of crude acid is 105 g. (91%), M.P. 118–121° C. Recrystallization from 315 ml. of n-butyl acetate yields 81 g. (77% recovery) of pure 6-methylchroman-8-carboxylic acid, M.P. 122–123° C.

(B) 6 - methylchroman - 8 - carbonyl chloride: 38.4 g. of 6-methylchroman-8-carboxylic acid is slurried in a mixture of 130 ml. of isooctane and 0.5 ml. of dimethylformamide. 21 ml. of thionyl chloride is then added dropwise after which the temperature is slowly raised to 45° C. The mixture is stirred at 45° C. to 50° C. until the gas evolution ceases after which it is cooled to 0° C. The crystals are filtered off and are washed with cold (0° C.) isooctane. After drying in vacuum there is obtained 38.4 g. (91%) of 6-methylchroman-8-carbonyl chloride, M.P. 46–48° C.

(C) 4 - (2-(6-methylchroman-8-carboxamido)-ethyl)-benzenesulfonamide: 32 g. of 4-(2-aminoethyl)-benzenesulfonamide is dissolved in a mixture of 240 ml. of water, 120 ml. of dioxane and 14 ml. of 37% hydrochloric acid. The solution is cooled to 5° C. and pH is adjusted to 9.8. A solution of 33.7 g. of 6-methylchroman-8-carbonyl chloride in 120 ml. of dioxane is now added dropwise at 5° C. to 10° C. while pH is maintained at 9.8 by simultaneous addition of 4 N sodium hydroxide solution. Stirring is continued at these conditions for additional two hours after the addition and pH is then lowered to approximately 3 by addition of hydrochloric acid. The crystals are filtered off and are washed with dioxane-water (1:1) and then with water. After drying the yield of crude material, M.P. 210–214° C., is 48.5 g. (81%). This material is dissolved in a hot mixture of 485 ml. dioxane and 121 ml. water and to the resulting clear solution is then added 364 ml. of water. The slurry is cooled to 20° C. and the crystals are filtered off and are washed first with 50 ml. of dioxane-water (1:1) and then with water twice. After drying there is obtained 41.7 g. (86% recovery) of pure 4 - (2 - (6 - methylchroman-8-carboxamido)-ethyl)-benzenesulfonamide, M.P. 216–217° C.

(D) N - (4 - (2 - (6-methylchroman-8-carboxamido)-ethyl) - benzenesulfonyl)-N'-(4-methylcyclohexyl)-urea: 3.1 g. of anhydrous potassium carbonate (finely divided) 3.8 g. of 4-(2-(6-methylchroman-8-carboxamido)-ethyl)-benzenesulfonamide, 1.8 g. of 4-methylcyclohexyl isocyanate and 65 ml. of acetone are mixed and stirred with reflux for 16 hours. The slurry is then cooled and the solids are filtered off and washed with acetone. The moist cake is dissolved in a mixture of 100 ml. of water and 75 ml. of acetone and the pH of this solution is adjusted to 9.2. A small amount of insoluble material is removed by filtration and the filtrate is then added with stirring to an excess of dilute hydrochloric acid. The crystals are filtered off and are washed thoroughly with water. After drying at 60° C. there is obtained 4.4 g. (86%) of almost pure material having a M.P. of 197–199° C. Recrystallization from dimethylformamide-methanol yields 3.6 g. (82% recovery) of pure N-(4-(2-(6-methylchroman-8-carboxamido) - ethyl) - benzenesulfonyl) - N' - (4-methylcyclohexyl) - urea, M.P. 199–200° C.

EXAMPLE 2

N - (4 - (2 - (6 - methylchroman-8-carboxamido)-ethyl)-benzenesulfonyl)-N'-cyclopentylurea (A) Ethyl - N - (4 - (2 - (6 - methylchroman-8-carboxamido) - ethyl) - benzenesulfonyl)-carbamate, M.P. 184–185° C. (dioxane-water), is prepared from 4-(2-(6-methylchroman - 8 - carboxamido)-ethyl)-benzenesulfonamide and ethyl chloroformate as described by Marshall (J. Org. Chem. 23, 927 (1958)).

(B) N - (4 - (2 - (6 - methylchroman-8-carboxamido)-ethyl)-benzenesulfonyl)-N'-cyclopentylurea.

4.5 g. of ethyl-N-(4-(2-(6-methylchroman-8-carboxamido)-ethyl)-benzenesulfonyl)-carbamate, 1.0 g. of cyclopentylamine, 25 ml. of dimethylformamide and two drops of triethylamine are mixed and stirred at 75° C. for 90 minutes. The temperature is then raised to 110° C. and stirring at this temperature is continued for 90 minutes after which the mixture is cooled to room temperature and is poured into ice and water containing a small amount of hydrochloric acid. The precipitate is filtered off and is washed with water and then dried. The yield of almost pure material is 4.5 g. (93%). Recrystallization from methanol yields pure N-(4-(2-(6-methylchroman-8-carboxamido) - ethyl) - benzenesulfonyl)-N'-cyclopentyl urea, M.P. 194–195° C.

EXAMPLE 3

N-(4-(2-(6-chlorochroman-8-carboxamido)-ethyl)-benzenesulfonyl)-N'-cyclohexylurea Using methyl-5-chlorosalicylate as starting material and proceeding through the same steps as in Example 1 there is prepared:

(A) 6-chlorochroman-8-carboxylic acid.

(a) Methyl-2-allyloxy-5-chlorobenzoate, B.P. (0.2 mm. Hg)=96–98° C., M.P. 30.5° C.

(b) Methyl-3-allyl-5-chlorosalicylate, B.P. (0.4 mm. Hg)=104–105° C.

(c) Methyl-3-allyl-5-chloro-acetylsalicylate, M.P. 48–50° C. (n-hexane), and (d) 6-chlorochroman-8-carboxylic acid, M.P. 159–160° C. (xylene).

(B) 6-chlorochroman-8-carbonyl chloride, M.P. 96–97° C.

(C) 4-(2-(6-chlorochroman - 8 - carboxamido)-ethyl)-benzenesulfonamide, M.P. 221–222° C. (dimethylformamide-methanol).

(D) N-(4-(2-(6 - chlorochroman - 8 - carboxamido)-ethyl)-benzenesulfonyl)-N'-cyclohexylurea, M.P. 198–199° C. (dimethylformamide-methanol), is obtained from 4 - (2 - (6 - chlorochroman - 8 - carboxamido)-ethyl)- benzenesulfonamide and cyclohexyl isocyanate by the method described in Example 1, Step D.

EXAMPLE 4

N-(4-(2-(6-methoxychroman-8-carboxamido)-ethyl)-benzenesulfonyl)-N'-cyclohexylurea Using methyl-5-methoxysalicylate as starting material and proceeding through the same steps as in Example 1 there is prepared:

(A) 6-methoxychroman-8-carboxylic acid.
  (a) Methyl-2-allyloxy-5-methoxybenzoate, B.P. (0.9 mm. Hg)=123–126° C., M.P. 42–43° C. (hexane),
  (b) Methyl-3-allyl-5-methoxysalicylate, B.P. (0.9 mm. Hg)=114–117° C.,
  (c) Methyl-3-allyl-5-methoxy-acetylsalicylate, B.P. (0.4 mm. Hg)=129–130° C., and
  (d) 6-methoxychroman-8-carboxylic acid, M.P. 109–110° C., (isopropyl alcohol).

(B) 6-methoxychroman-8-carbonyl chloride.

(C) 4-(2-(6 - methoxychroman - 8 - carboxamido)-ethyl)-benzenesulfonamide, M.P. 228–230° C. (dimethylformamide-methanol).

(D) N-(4-(2-(6-methoxychroman - 8 - carboxamido)-ethyl)-benzenesulfonyl)-N'-cyclohexylurea, M.P. 183–184° C. (dimethylformamide-methanol), is obtained from 4-(2-(6-methoxychroman-8-carboxamido)-ethyl)-benzenesulfonamide and cyclohexyl isocyanate by the method described in Example 1, Step D.

EXAMPLE 5

N-(4-(2-(6-bromochroman-8-carboxamido)-ethyl)-benzenesulfonyl)-N'-cyclohexylurea Using methyl-5-bromosalicylate as starting material and proceeding through the same steps as in Example 1 there is prepared:

(A) 6-bromochroman-8-carboxylic acid.
  (a) Methyl-3-allyloxy-5-bromobenzoate, B.P. (0.4 mm. Hg)=103–104° C., M.P. 31–32° C. (hexane),
  (b) Methyl-3-allyl-5-bromosalicylate, B.P. (0.3 mm. Hg)=98–99° C.,
  (c) Methyl-3-allyl-5-bromo-acetylsalicylate, M.P. 66–67° C. (hexane), and
  (d) 6-bromochroman-8-carboxylic acid, M.P. 167–168° C. (n-butyl acetate).

(B) 6-bromochroman-9-carbonyl chloride.

(C) 4-(2-(6-bromochroman - 8 - carboxamido)-ethyl)-benzenesulfonamide, M.P. 235–236° C. (dimethylformamide-methanol).

(D) N-(4-(2-(6-bromochroman - 8 - carboxamido)-ethyl) - benzenesulfonyl) - N' - cyclohexylurea, M.P. 190–191° C. (dimethylformamide-methanol), is obtained from 4-(2-(6-bromochroman - 8 - carboxamido)-ethyl)-benzenesulfonamide and cyclohexyl isocyanate by the method described in Example 1, Step D.

EXAMPLE 6

N-(4-(2-(6-methoxychroman-8-carboxamido)-ethyl)-benzenesulfonyl)-N'-(4-methylcyclohexyl)-urea 3.1 g. of anhydrous potassium carbonate, 3.9 g. of 4-(2-(6-methoxychroman - 8 - carboxamido)-ethyl)-benzenesulfonamide, 1.7 g. of 4-methylcyclohexyl isocyanate and 65 ml. of acetone are stirred and refluxed for 19 hours. An almost clear solution is formed since only excess potassium carbonate remains undissolved. The solution is cooled and is then filtered. Acetone is distilled off in vacuum from the filtrate and the residue (6.3 g.) is dissolved in 200 ml. of water. The solution is heated to 60 C. and maintained at this temperature for one hour after which it is left standing overnight. The pH is then adjusted to 9.2 and the solids are removed by filtration. The filtrate is added with stirring to an excess of dilute hydrochloric acid. The crystals are filtered off and are washed with water and then dried at 60° C. Recrystallization from methanol yields pure N-(4-(2-(6-methoxychroman-8-carboxamido) - ethyl)-benzenesulfonyl)-N'-(4-methylcyclohexyl)-urea, M.P. 159–161° C.

EXAMPLE 7

N-(4-(2-(6-chlorochroman - 8 - carboxamido)-ethyl)-benzenesulfonyl) - N' - (1,4-endoethylenecyclohexyl)-urea (A) Ethyl-N-(4 - (2-(6 - chlorochroman - 8 - methoxamido)-ethyl)-benzenesulfonyl)-carbamate, M.P. 178–181° C. (dimethylformamide-water), is prepared from 4-(2-(6-chlorochroman - 8 - carboxamido)-ethyl)-benzenesulfonamide and ethyl chloroformate as described by Marshall (J. Org. Chem. 23, 927 (1958)).

(B) N-(4-(2-(6-chlorochroman - 8 - carboxamido)-ethyl)-benzenesulfonyl) - N' - (1,4-endoethylenecyclohexyl)-urea.

4.7 g. of ethyl-N-(4-(2-(6-chlorochroman-8-carboxamido)-ethyl)-benzenesulfonyl)-carbamate, 2.3 g. of 1-aminobicyclo[2.2.2]octane hydrobromide (1,4 - endoethylenecyclohexylamine hydrobromide, M.P. 345° C.), 2.0 ml. of triethylamine and 25 ml. of dimethylformamide are reacted and worked up as described in Example 2 to yield N-(4-(3-(6-chlorochroman-8-carboxamido)-ethyl)-benzenesulfonyl) - N' - (1,4-endoethylene-cyclohexyl)-urea, M.P. 175–176° C. (methanol-water).

EXAMPLE 8

N-(4-(2-(6-chlorochroman - 8 - carboxamido)-ethyl)-benzenesulfonyl)-N'-(trans-4-methylcyclohexyl)-urea A solution of 2.3 g. of 6-chlorochroman-8-carbonyl chloride in 30 ml. of acetone is added dropwise at 0° C. to 5° C. to a stirred solution of 3.5 g. of N-(4-(2-aminoethyl)-benzenesulfonyl) - N' - (trans - 4 - methylcyclohexyl)-urea in a mixture of 50 ml. of water and 25 ml. of acetone while the pH is kept at 9.8 by simultaneous addition of 4 N sodium hydroxide solution. Stirring is continued for one hour after the addition and the pH is then adjusted to approximately 2 by addition of dilute hydrochloric acid. The crystals are filtered off and are washed first with an acetone-water mixture (1:1) and then with water after which they are dried at 60° C. The yield of crude material amounts to 4.1 g. (74%). Recrystallization from chloroform-methanol yields 2.8 g. (68% recovery) of pure N-(4-(2-(6-chlorochroman-8-carboxamido)-ethyl)-benzenesulfonyl) - N' - (trans-4-methylcyclohexyl)-urea, M.P. 190–191° C. The potassium salt of this compound, M.P. 198–200° C., is prepared in aqueous acetone through treatment with a slight excess of potassium hydroxide.

EXAMPLE 9

N-(4-(2-(6-chloro-2H-chromen-8-carboxamido)-ethyl)-benzenesulfonyl)-N'-cyclohexylurea (A) 6-chloro-2H-chromen-8-carboxylic acid.
  (a) Methyl ester of 6-chlorochroman-8-carboxylic acid. 106.4 g. of 6-chlorochroman-8-carboxylic acid, 2.0 g. of p-toluenesulfonic acid and 1500 ml. of methanol are refluxed for 24 hours. Methanol is then stripped off in vacuum and the residue (115 g.) is dissolved in 400 ml. of benzene. This solution is washed twice with a saturated solution of sodium bicarbonate and is then dried over anhydrous sodium sulfate. The benzene is stripped off in vacuum and the residue, 95.1 g. (84%), may be used in the next step without further purification. Distillation in vacuum yields the pure methyl ester of 6-chlorochroman-8-carboxylic acid, B.P. (0.15 mm. Hg)=114–116° C.
  (b) 6-chloro-2H-chromen-8-carboxylic acid. 11.4 g. of 6-chlorochroman-8-carboxylic acid methyl ester 8.9 g. of N-bromosuccinimide, 0.1 g. of benzoyl peroxide and 175 ml. of carbon tetrachloride are mixed and stirred at reflux for two hours. The reaction mixture is then cooled to 20° C. and the succinimide formed (4.8 g. when dry or 97%) is removed by filtration. Carbon tetrachloride is distilled off from the filtrate and washed at reduced pressure and the residue (15.3 g.) is dissolved in 100 ml. of dimethylformamide. 4.1 g. of lithium carbonate is added to this solution and the resulting slurry is refluxed for two hours. Dimethylformamide is then distilled off in vacuum and the residue is mixed with 100 ml. of 10% sodium hydroxide solution, refluxed for one hour and then cooled to 0° C. The sodium salt of 6-chloro-2H-chromen-8-carboxylic acid is filtered off and is then washed with a saturated solution of sodium chloride. The moist cake is redissolved in water and this solution is added with stirring to a mixture of 25 ml. of 37% hydrochloric acid and 150 of crushed ice. The precipitate is filtered off and washed thoroughly with water. After drying there is obtained 7.2 g. of (67.9%) of crude acid. Recrystallization from acetic acid yields 5.6 g. (78% recovery) of pure 6-chloro-2H-chromen-8-carboxylic acid, M.P. 204–205° C.

(B) 6-chloro-2H-chromen-8-carbonyl chloride is prepared from the 6-chloro-2H-chromen-8-carboxylic acid and thionyl chloride as described in Example 1, Step B.

(C) 4-(2-(6-chloro - 2H - chromen-carboxamido)-ethyl)-benzenesulfonamide, M.P. 206–207° C., decomp. (dimethylformamide-methanol), is prepared from 6-chloro-2H-chromen-8-carbonyl chloride and 4-(2-aminoethyl)-benzenesulfonamide is described in Example 1, Step C.

(D) N-(4-(2-(6 - chloro - 2H - chromen-8-carboxamido)-ethyl)-benzenesulfonyl) - N' - cyclohexylurea, M.P. 181–183° C. (dimethylformamide-methanol), is prepared from 4-(2-(6-chloro - 2H - chromen-8-carboxamido)-ethyl)-benzenesulfonamide and cyclohexyl isocyanate by the method described in Example 1, Step D.

EXAMPLE 10

N-(4-(2-(6-methylchroman-8-carboxamido)-ethyl)-benzenesulfonyl)-N'-(2-cyclohexenyl)-urea A solution of 3.4 g. of 4-(2-(6-methylchroman-8-carboxamido)-ethyl)-benzenesulfonamide in 45 ml. of dimethylformamide is added dropwise to a stirred suspension of 0.27 g. sodium hydride in 15 ml. of dimethylformamide at 50° C. to 60° C. The mixture is then heated to 100° C. and is stirred at this temperature until the evolution of hydrogen ceases. A solution of 2.0 g. of phenyl-N-(2-cyclohexenyl)-carbamate (M.P. 113–115° C.), prepared from 2-cyclohexenyl amine and phenyl chloroformate in ether containing an excess of triethylamine) in 25 ml. of dimethylformamide is then added and the mixture is stirred at 100° C. for one hour. Dimethylformamide is now stripped off in vacuum and the residue is dissolved in a mixture of 250 ml. of water, 2 ml. of 4 N sodium hydroxide solution and 100 ml. of acetone. The pH is adjusted to 9.1 and a trace of insoluble material is removed by filtration. The filtrate is then added with stirring to a mixture of excess dilute hydrochloric acid and crushed ice. The precipitate is filtered off, washed with water and dried. The yield of crude product, M.P. 178–181° C., is 4.0 g. (88%). Recrystallization from acetone-water (after treatment with charcoal) yields pure N-(4-(2-(6-methylchroman - 8 - carboxamido)-ethyl)-benzenesulfonyl)-N'-(2 - cyclohexenyl) - urea, M.P. 191–192° C.

EXAMPLE 11

N-(4-(2-(6-chlorochroman-8-carboxamido)-ethyl)-benzenesulfonyl)-N'-(2-cyclohexenyl)-urea 4-(2-(6-chlorochroman - 8 - carboxamido)-ethyl)-benzenesulfonamide and phenyl-N-(2-cyclohexenyl)-carbamate are reacted and worked up as described in Example 10 to yield N-(4-(2-(6-chlorochroman-8-carboxamido)-ethyl)-benzenesulfonyl)-N'-(2 - cyclohexenyl)-urea, M.P. 189–190° C. (methanol-dioxane-water).

EXAMPLE 12

N-(4-(2-(6-chlorochroman-8-carboxamido)-ethyl)-benzenesulfonyl)-N'-n-butylurea 4.75 g. of 4-(2-(6-chlorochroman-8-carboxamido)-ethyl)-benzenesulfonamide, 3.8 g. of anhydrous potassium carbonate and 1.5 g. of n-butyl isocyanate are reacted and worked up as described in Example 1, Step D, to yield N-(4-(2-(6-chlorochroman - 8 - carboxamido)-ethyl)-benzenesulfonyl)-N'-n-butylurea, M.P. 180–181° C. (precipitated in water).

EXAMPLE 13

N-(4-(2-(6-methylchroman-8-carboxamido)-ethyl)-benzenesulfonyl)-N'-cyclohexylurea 4.5 g. of ethyl-N-(4-(2-(6-methylchroman-8-carboxamido)-ethyl)-benzenesulfonyl)-carbamate and 1.2 g. of cyclohexylamine are reacted and worked up as described in Example 2, Step B, to yield N-(4-(2-(6-methylchroman - 8 - carboxamido) - ethyl)-benzenesulfonyl)-N'-cyclohexylurea, M.P. 219–220° C. (ethanol-dimethylformamide-water).

EXAMPLE 14

N-(4-(2-(6-methylchroman-8-carboxamido)-ethyl)-benzenesulfonyl)-N'-isobutylurea 4.5 g. of ethyl-N-(4-(2-(6-methylchroman-8-carboxamido)-ethyl)-benzenesulfonyl)-carbamate and 0.9 g. of isobutylamine are reacted and worked up as described in Example 2, Step B, to yield N-(4-(2-(6-methylchroman - 8 - carboxamido)-ethyl)-benzenesulfonyl)-N'-isobutylurea, M.P. 192–193° C. (methanol).

EXAMPLE 15

N-(4-(2-(chroman-8-carboxamido)-ethyl)-benzenesulfonyl)-N'-cyclohexylurea (A) Chroman-8-carboxylic acid, M.P. 91–92° C. (carbon tetrachloride), is a known compound (loc. cit.).

(B) Chroman-8-carbonyl chloride is prepared by the method described in Example 1, Step B.

(C) 4-(2-(chroman - 8 - carboxamido)-ethyl)-benzenesulfonamide, M.P. 194–195° C. (dimethylformamide-methanol), is prepared by the method described in Example 1, Step C.

(D) N-(4-(2-(chroman - 8 - carboxamido)-ethyl)-benzenesulfonyl)-N'-cyclohexylurea, M.P. 198–199° C. (dimethylformamide-methanol) is prepared from cyclohexyl isocyanate and 4-(2-(chroman-8-carboxamido)-ethyl)-benzenesulfonamide by the method described in Example 1, Step D.

EXAMPLE 16

N-(4-(2-(chroman-8-carboxamido)-ethyl)-benzenesulfonyl)-N'-n-butylurea

4 - (2 - (chroman - 8 - carboxamido)-ethyl)-benzenesulfonamide and n-butyl isocyanate are reacted and worked up as described in Example 1, Step D, to yield N - (4-(2-(chroman-8-carboxamido)-ethyl)-benzenesulfonyl)N'-n-butylurea, M.P. 136–137° C. (methanol).

What we claim is:
1. A compound of the formula:

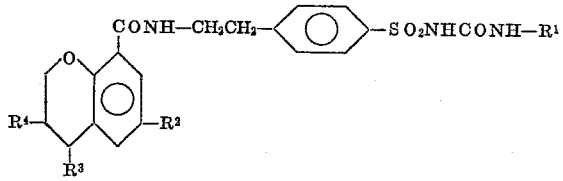

in which R¹ is n-butyl, isobutyl, cyclopentyl, cyclohexyl, 4-methylcyclohexyl, cyclohexenyl or endoethylene-cyclohexyl, R² is methyl, methoxy, chlorine, bromine or hydrogen, R³ and R⁴ are each hydrogen, or R³ and R⁴ may together form an additional bond in which case R² is chlorine only, and its pharmaceutically acceptable alkali metal salts.

2. A compound as claimed in claim 1 in which $R^1$ is 4-methylcyclohexyl.

3. A compound as claimed in claim 1 in which $R^1$ is cyclohexyl.

4. A compound according to claim 1 in which the compound is N-(4-(2-(6-methylchroman-8-carboxamido)-ethyl)-benzenesulfonyl)-N'-(4-methylcyclohexyl)-urea.

5. A compound according to claim 1 in which the compound is N-(4 - (2 - (6 - methoxychroman-8-carboxamido)-ethyl)-benzenesulfonyl)-N'-cyclohexylurea.

6. A compound according to claim 1 in which the compound is N - (4 - (2 - (6 - chlorochroman-8-carboxamido)-ethyl)-benzenesulfonyl)-N'-cyclohexylurea.

7. A compound according to claim 1 in which the compound is N - (4 - (2 - (6 - bromochroman-8-carboxamido)-ethyl)-benzenesulfonyl)-N'-cyclohexylurea.

8. A compound according to claim 1 in which the compound is N - (4 - (2 - (6 - chlorochroman - 8 - carboxamido)-ethyl)-benzenesulfonyl)-N'-(trans - 4 - methylcyclohexyl)-urea.

9. A compound according to claim 1 in which the compound is N - (4 - (2 - (6 - chloro-2H-chromen-8-carboxamido)-ethyl)-benzenesulfonyl)-N'-cyclohexylurea.

10. A compound according to claim 1 in which the compound is N - (4 - (2 - (6 - methylchroman-8-carboxamido)-ethyl)-benzenesulfonyl)-N'-(2 - cyclohexenyl)-urea.

11. A compound according to claim 1 in which the compound is N - (4 - (2 - (6 - chlorochroman - 8-carboxamido)-ethyl)-benzenesulfonyl)-N'-(2 - cyclohexenyl)-urea.

12. A compound according to claim 1 in which the compound is N - (4 - (2 - (6 - methylchroman-8-carboxamido)-ethyl)-benzenesulfonyl)-N'-cyclohexylurea.

13. A compound according to claim 1 in which the compound is N - (4 - (2 - (chroman-8-carboxamido)-ethyl)-benzenesulfonyl)-N'-cyclohexylurea.

References Cited
FOREIGN PATENTS
118,553  9/1970  Denmark.
119,052  11/1970  Denmark.

JOHN M. FORD, Primary Examiner

U.S. Cl. X.R.

424—283

UNITED STATES PATENT OFFICE
CERTIFICATE OF CORRECTION

Patent No. 3,803,176          Dated April 9, 1974

Inventor(s) Haldor Christensen, Behrend Friedrich Lundt Frederik Christian Gronvald and William Andersen It is certified that error appears in the above-identified patent and that said Letters Patent are hereby corrected as shown below:

Column 1, line 6, "Laboratorum" should be --Laboratorium--

Column 3, line 32, the potassium should be hydrogen

Column 5, line 32, "$C_3$" should be --$C_4$--

In Table I, No. 4, "chroman" should be --chromen--

In Table I, No. 4, "benesulfonyl" should be --zenesulfonyl--

Column 9, line 70, the degree sign should be inserted after "60"

Signed and sealed this 4th day of March 1975.

(SEAL)
Attest:

RUTH C. MASON
Attesting Officer

C. MARSHALL DANN
Commissioner of Patents
and Trademarks

UNITED STATES PATENT OFFICE
CERTIFICATE OF CORRECTION

Patent No. 3,803,176  Dated April 9, 1974

Inventor(s) Haldor Christensen, Behrend Friedrich Lundt, Frederik Christian Gronvald and William Andersen It is certified that error appears in the above-identified patent and that said Letters Patent are hereby corrected as shown below:

In the masthead, column 1, between lines 10 and 11 insert the following:

--Claims priority, application Great Britain, May 9, 1969, 23888/69; application Great Britain, August 27, 1969, 42763/69; and application Great Britain, November 24, 1969, 57434/69--

Signed and Sealed this first Day of June 1976

[SEAL]

Attest:

RUTH C. MASON
Attesting Officer

C. MARSHALL DANN
Commissioner of Patents and Trademarks